United States Patent [19]

Ishimoto et al.

[11] Patent Number: 5,594,564

[45] Date of Patent: Jan. 14, 1997

[54] SPACE LIGHT MODULATING APPARATUS HAVING A LENGTH TO WIDTH RATIO OF 30:1 AND STAGGERED DRIVERS

[75] Inventors: Manabu Ishimoto; Masayuki Kato; Hirokazu Aritake; Noriko Sato, all of Kawasaki, Japan

[73] Assignee: Fujitsu Limited, Kawasaki, Japan

[21] Appl. No.: 475,505

[22] Filed: Jun. 7, 1995

Related U.S. Application Data

[63] Continuation of Ser. No. 97,049, Jul. 27, 1993, abandoned.

[30] Foreign Application Priority Data

Aug. 21, 1992 [JP] Japan ................................. 4-222589

[51] Int. Cl.$^6$ ................................................ G02F 1/1343
[52] U.S. Cl. .............................. 349/143; 359/11; 359/22; 349/42
[58] Field of Search ........................ 359/11, 13, 9, 359/22, 23, 29, 32, 54, 59, 93, 94, 95, 573

[56] References Cited

U.S. PATENT DOCUMENTS

| | | | |
|---|---|---|---|
| 4,666,252 | 5/1987 | Yaniv et al. | 359/59 |
| 4,818,075 | 4/1989 | Takao et al. | 359/59 |
| 5,119,214 | 6/1992 | Nishi et al. | 359/9 |
| 5,150,241 | 9/1992 | Joffre et al. | 359/95 |
| 5,151,814 | 9/1992 | Grinberg et al. | 359/573 |
| 5,182,665 | 1/1993 | O'Callaghan et al. | 359/95 |
| 5,237,443 | 8/1993 | Haines et al. | 359/9 |

FOREIGN PATENT DOCUMENTS

| | | |
|---|---|---|
| 0259875 | 3/1988 | European Pat. Off. . |
| WO90/04218 | 4/1990 | WIPO . |

OTHER PUBLICATIONS

Benton, "Experiments in holographic video imaging", SPIE Institute Series vol. 15 8, 1990, pp. 247–267.
"Video Device," Maruoka Koichi, Patent Abstracts of Japan, vol. 13, No. 312, (E–788), Jul. 17, 1989.

Primary Examiner—William L. Sikes
Assistant Examiner—James A. Dudek
Attorney, Agent, or Firm—Staas & Halsey

[57] ABSTRACT

A space light modulating apparatus suitable for reconstruction of an electronic 1-dimensional hologram having no movable section. A predetermined display region is divided into a plurality of stripe-like regions each having a screen width $L_x$ in the horizontal direction and a microwidth $\Delta L_y$ in the vertical direction. A plurality of pixels each having a dimensional ratio such that a lateral width in the horizontal direction is enough smaller than a vertical width in the vertical direction are arranged in each of the stripe-like regions. Further, a driving element for controlling the optical characteristics is provided every pixel. A dimensional ratio in the vertical and horizontal directions of the pixels arranged in each stripe region is equal to or larger than 30:1.

24 Claims, 13 Drawing Sheets

SPACE LIGHT MODULATING APPARATUS HAVING A LENGTH TO WIDTH RATIO OF 30:1 AND STAGGERED DRIVERS

This application is a continuation, of application Ser. No. 08/097,049, filed Jul. 27, 1993, now abandoned.

BACKGROUND OF THE INVENTION

1. Field of the Invention

The present invention relates to a space light modulating apparatus for modulating a space light by changing a phase, an amplitude, or the like of the light which passes and, more particularly, to a space light modulating apparatus in which a display screen is divided into stripe-like regions and a phase distribution of a hologram is electronically formed by a change in phase or amplitude of the transmitted light due to the control of microsegments arranged one-dimensionally every region, thereby displaying a solid image.

2. Description of the Related Art

A stereoscopic display using a hologram enables a structure of a depth, a thickness, and the like of a 3-dimensional object to be easily visually understood. Such a stereoscopic display is largely demanded in the display of a designed structural object, the display of a medical image, and the like. A solid image is impressive as compared with a 2-dimensional display and is also used in the display for an amusement in an amusement park, a movie, or the like.

Hitherto, a hologram to stereoscopically display an imaginary object cannot be formed by an ordinary hologram forming method whereby an object wave is interfered with a reference wave. Therefore, there is known a holographic stereogram method whereby 2-dimensional images when a 3-dimensional object is seen from various different directions are calculated from 3-dimensional shape data and a hologram interference fringe is sequentially recorded by a hologram interference exposure into stripe-like regions each having a microwidth in the horizontal direction and a width of screen in the vertical direction. According to the holographic stereogram method, however, a 2-dimensional image is fundamentally seen and the plane on which focal points of the eyes are located doesn't coincide with the position of an image that is observed due to a parallax of both eyes. Consequently, it is hard to see such an image, resulting in a cause of a fatigue. Particularly, in case of displaying an image at a position on this side than the screen, a burden on the eyes increases and a preferable stereoscopic display cannot be obtained.

To form a natural solid image (hologram) of an imaginary object, there is a method whereby a phase distribution (interference fringe) of the hologram is calculated from the 3-dimensional shape data and the calculated phase distribution and is recorded using a laser drawing apparatus or the like while spatially changing an exposure amount. Benton et al. who are professors at the Massachusetts Institute of Technology (MIT) have proposed a method of recording a hologram which is divided into stripe-like regions each having a width of screen in the horizontal direction and a microwidth in the vertical direction and in which only the parallax in the horizontal direction has been preserved in each region. A very large amount of calculations of the phase distribution of the hologram can be remarkably reduced by eliminating the parallax the vertical direction. As a hologram recording or reproducing apparatus, there is known a method whereby a modulated surface acoustic wave, namely, a moving interference fringe is generated by an acoustic optical element and the image of the interference fringes is set into a stationary state by the tracing operation of a scanning mirror. According to the hologram forming method by Prof. Benton et al., only the parallax in the horizontal direction is recorded into the divided stripe-like regions, so that it is advantageous when the interference fringes are calculated. However, such a method is a method of directly observing the hologram reconstruction image, so that there are problems such that the hologram interference fringes cannot be recorded as a hard copy onto a medium and a hologram cannot be reconstructed and displayed from the interference fringes recorded on the medium.

On the other hand, for example, as shown in FIG. 1, a method using a liquid crystal display in a display apparatus of a phase distribution of a hologram has been proposed as a trial to electronically reconstruct a hologram (JP-A-64-84993). FIG. 1 shows a liquid crystal display 100 having 36 (6 (vertical direction)×6 (horizontal direction)) liquid crystal cells 102 for simplicity of explanation. A thin film field effect transistor (TFT) 104 is arranged in a non-transmitting region, shown by a hatched portion as a driving element in each liquid crystal cell 102. As shown in FIG. 2, the TFT 104 is constructed in a manner such that a voltage control line 106 in the horizontal direction arranged in a matrix form is connected to a source, a scan line 108 in the vertical direction is connected to a gate, and a drain is pulled up to a power source voltage $V_{cc}$ through the liquid crystal cell 102. When a control voltage is applied to the scan line 108 at a predetermined timing, the transistor 104 is turned on. Now, assuming that a control voltage of the control line 106 at this time is equal to $V_0$, a voltage of $(V_{cc}-V_0)$ is applied to the liquid crystal cell 102. Since a refractive index of the liquid crystal cell 102 changes in accordance with the applied voltage, an optical propagation distance changes, so that a phase or amplitude of the light which passes can be controlled.

However, in the case where a 1-dimensional hologram, which has been proposed by Prof. Benton et al., for instance, is electronically formed and displayed by such a conventional liquid crystal display, in order to reconstruct a perfect 1-dimensional hologram, a very large amount of information in the horizontal direction must be handled, so that an ultrahigh fine construction of the liquid crystal cell is needed. On the other hand, it is impossible to avoid an increase in number of driving elements to drive an extremely large number of liquid crystal cells in the display screen and various difficulties occur. Namely, as shown in FIG. 2, in the case where the TFT 104 is provided for each of the liquid crystal cells 102, when the liquid crystal cells are ultrahigh finely formed, it is difficult to form the TFT 104 to each region of the display screen as shown in FIG. 1. When a non-display region due to the formation of the driving element exists in the liquid crystal cell 102, a problem of the interference occurs between the liquid crystal cells 102 when the light passes.

SUMMARY OF THE INVENTION

According to the invention, a space light modulating apparatus which is suitable to electronically reconstruct a 1-dimensional hologram having no movable portion is provided. A fundamental construction of the space light modulating apparatus of the invention is characterized in that a predetermined display region is divided into a plurality of stripe-like regions each having a screen width $L_x$ in the horizontal direction and a microwidth $\Delta L_y$ in the vertical direction, a plurality of pixels each having a dimensional ratio such that a vertical width $L_{10}$ in the vertical direction is enough larger than a horizontal width $L_{20}$ in the horizontal direction are arranged in each stripe-like region in the horizontal direction and, further, a driving section to control optical characteristics is provided every pixel. It is now assumed that the dimensional ratio of the pixels in the vertical direction and horizontal direction arranged in each stripe region is equal to or larger than 30:1. The driving sections which are provided every 16 pixels are collected to one or two locations and arranged on unit basis of a plurality of pixels.

As a pixel which is arranged in the stripe region, an element having a structure to control the optical characteristics, for instance, a liquid crystal in which a refractive index changes in accordance with the applied voltage and a phase or amplitude of the transmitted light can be controlled is used. That is, each of a plurality of pixels is constructed by a liquid crystal cell whose refractive index changes in accordance with a voltage that is applied across the pair of electrodes. One of the electrodes of each of a plurality of liquid crystal cells is formed by one electrode plate arranged in the whole area of each stripe region. The other electrode is formed by arranging in the horizontal direction a plurality of rectangular microelectrodes each having a dimensional ratio such that the lateral width in the horizontal direction is enough smaller than the vertical width in the vertical direction. In this case, it is assumed that the dimensional ratio of the vertical and horizontal directions of each of the microelectrodes arranged in the horizontal direction is equal to or larger than 30:1. The driving section provided every pixel is controlled, thereby changing the optical characteristics. A phase distribution of the 1-dimensional hologram is electronically produced every stripe-like region. Further, a reproduction light is irradiated to the phase distribution of a plurality of 1-dimensional holograms formed by the driving of the pixels. A hologram image is displayed by the optical wave front conversion of the reproduction light according to the phase distribution of the 1-dimensional holograms.

According to such a space light modulating apparatus of the invention as mentioned above, a number of micropixels each having a shape such that the dimensional ratio in the vertical and lateral directions of the pixel is equal to 30:1 or more are arranged every stripe region in the horizontal direction, so that the 1-dimensional hologram can be electronically formed with a high precision. On the other hand, there is used a structure such that the driving elements of each pixel are arranged in a lump on a unit basis of a plurality of pixels at a location where an influence is hardly exerted on the formation of the 1-dimensional hologram, for example, at one position on the lower side of the pixels arranged horizontally. Consequently, an array of the pixels in the horizontal direction is not obstructed by the arrangement of the driving elements and no non-display region exists in the horizontal direction. Thus, a phase distribution of the 1-dimensional holograms can be formed with a high accuracy.

The above and other objects, features, and advantages of the present invention will become more apparent from the following detailed description with reference to the drawings.

DETAILED DESCRIPTION OF THE PREFERRED EMBODIMENTS

Figure 1:
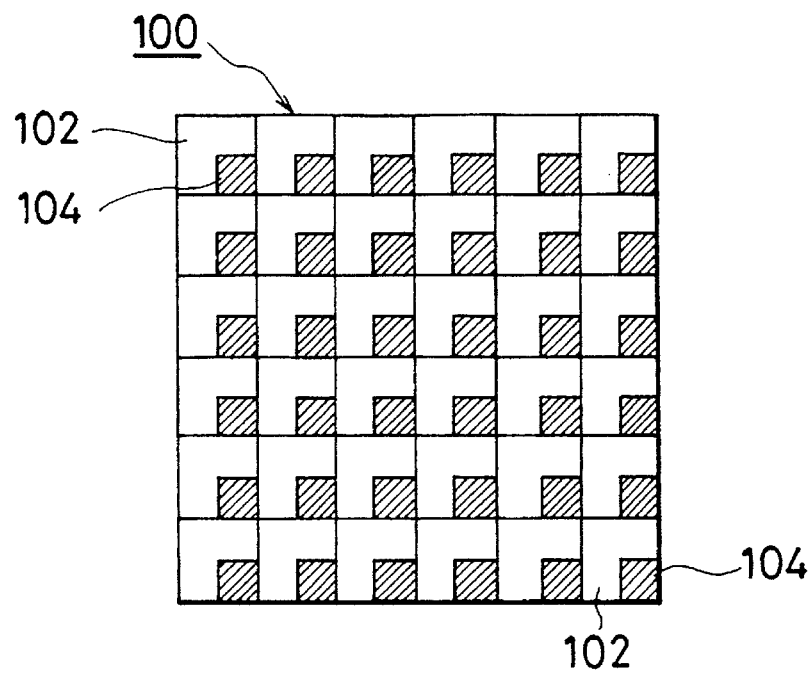
FIG. 1 is an explanatory diagram of a conventional liquid crystal display.
Figure 2:
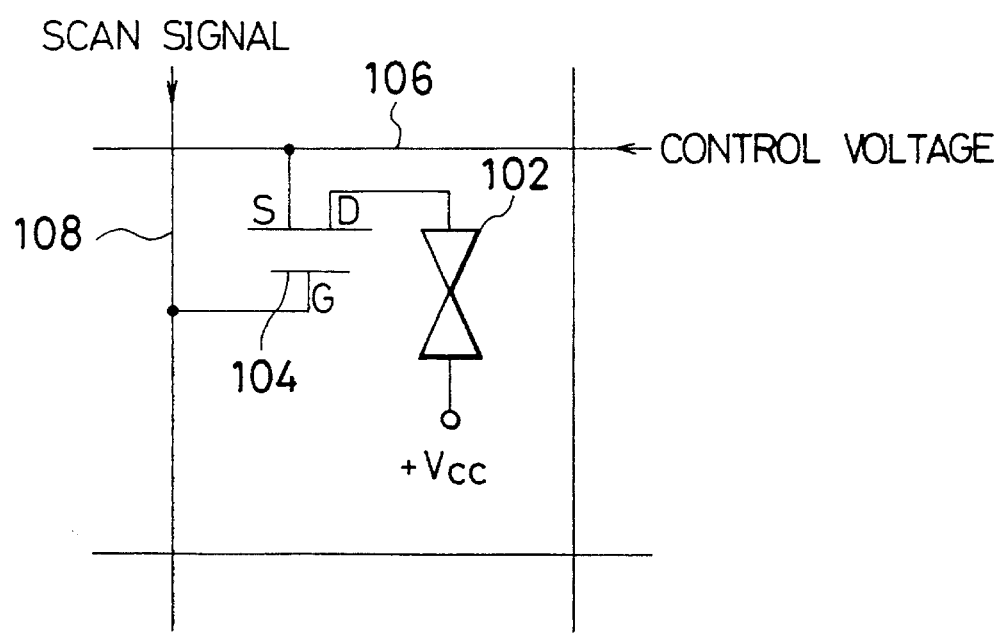
FIG. 2 is a circuit diagram of a conventional liquid crystal driving section.
Figure 3:
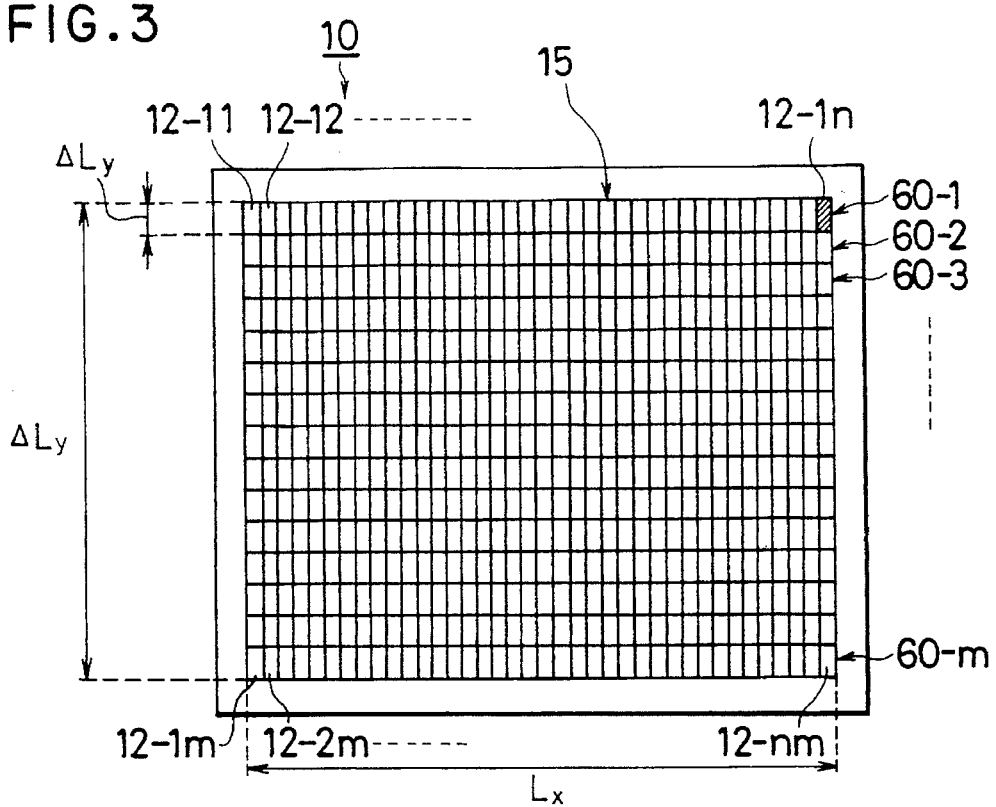
FIG. 3 is an explanatory diagram showing an embodiment of the invention.

In FIG. 3, a space light modulating apparatus 10 of the invention has a display region 15 having a lateral width $L_x$ in the horizontal direction and a vertical width $L_y$ in the vertical direction. The display region 15 is divided into a plurality of stripe regions 60-1, 60-2, - - - , 60-m each having the screen width $L_x$ in the horizontal direction and a microwidth $\Delta L_y$ in the vertical direction. In each of the stripe regions 60-1 to 60-m, for example, in the stripe region of the top row, (n) liquid crystal segments 12-11, 12—12, - - - , 12-1n are arranged. A total of (n×m) liquid crystal segments 12-11 to 12-nm are provided in the display region 15.

Figure 4:
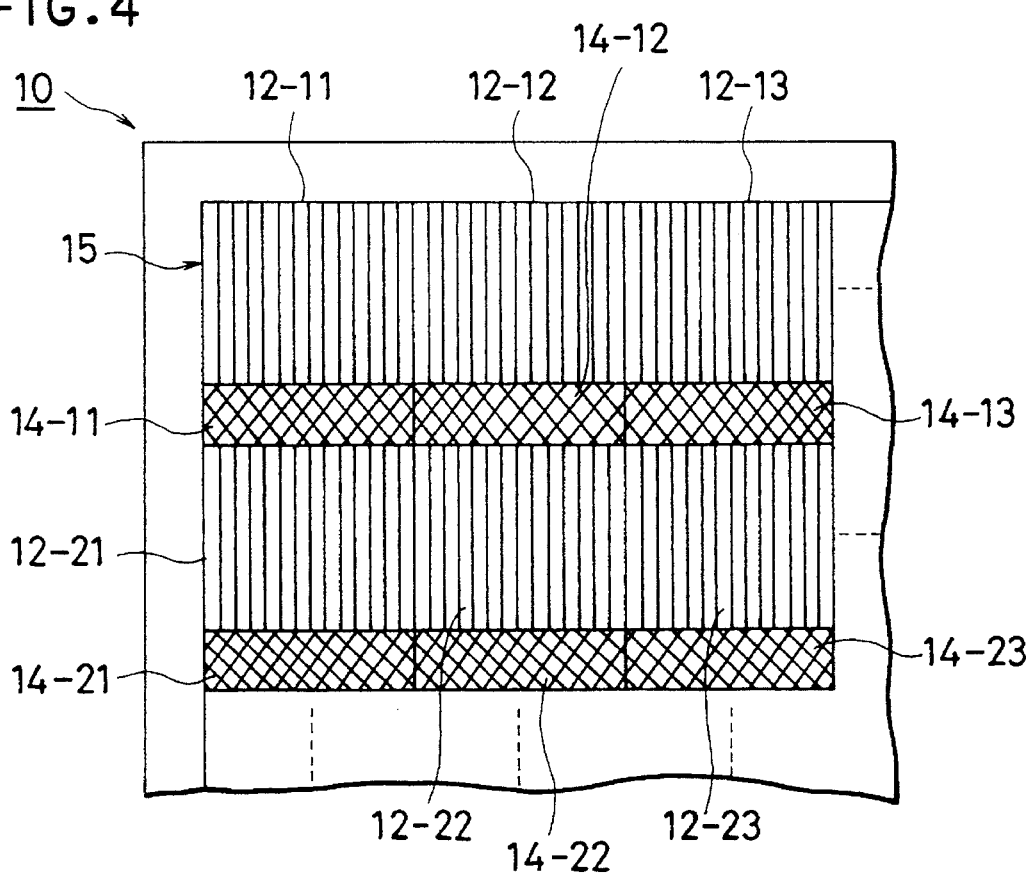
FIG. 4 is an explanatory diagram showing an enlarged view of a part of FIG. 3.

FIG. 4 shows an enlarged the left upper corner in FIG. 3. In each of the liquid crystal segments 12-11, 12—12, - - -, provided in the display region 15, a plurality of liquid crystal cells are arranged in the horizontal direction as rectangular pixels each of which is long in the vertical direction and has a narrow width in the lateral direction. Driving sections 14-11, 14-12, - - -, are provided on the lower side of the liquid crystal cells arranged.

Figure 5:
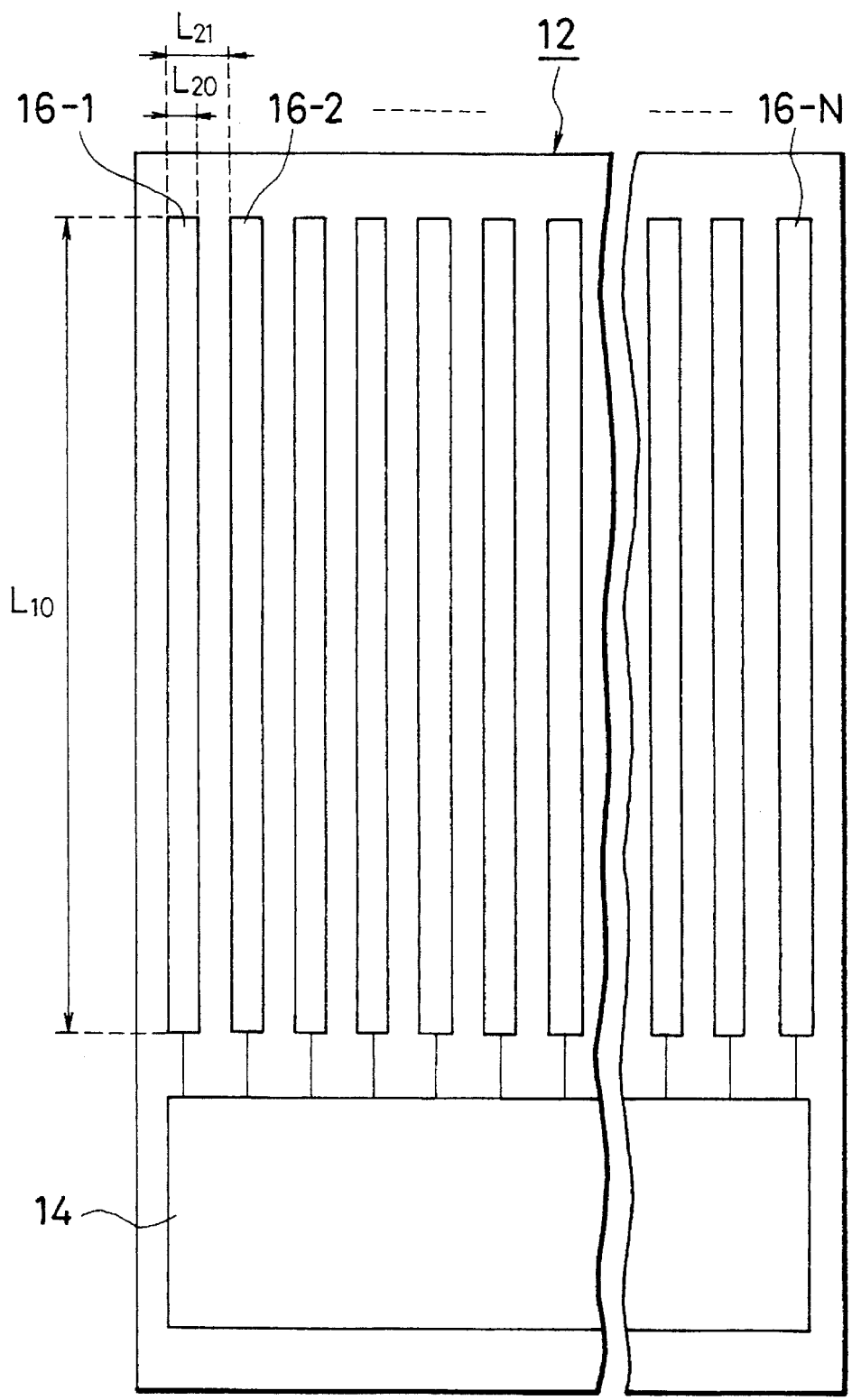
FIG. 5 is an explanatory diagram showing an enlarged view of one of liquid crystal segments shown in FIG. 4.

FIG. 5 shows an enlargely view of one of the liquid crystal segments 12 shown in FIG. 4. Liquid crystal cells 16-1, 16-2, - - -, 16-N are arranged in the horizontal direction in the liquid crystal segment 12. Each of the liquid crystal cells 16-1 to 16-N has a rectangular pixel shape having a dimensional ratio such that the vertical width $L_{10}$ in the vertical direction is larger than the lateral width $L_{20}$ in the horizontal direction. In each of the liquid crystal cells 16-1 to 16-N, a pitch interval between the adjacent liquid crystal cells is set to $L_{21}$ and, for example, there is a relation of $L_{21}=2\times L_{20}$. The dimensional ratio ($L_{10}$:$L_{20}$) in the vertical and horizontal directions of each of the liquid crystal cells 16-1 to 16-N is set to 30:1 or more. The number N of liquid crystal cells 16-1 to 16-N which are provided in one liquid crystal segment 12 is equal to, for example, 256. The driving section 14 is provided on the lower side of the liquid crystal cells 16-1 to 16-2. (N) driving elements are provided in the driving section 14 in correspondence to the liquid crystal cells 16-1 to 16-N.

Figure 6:
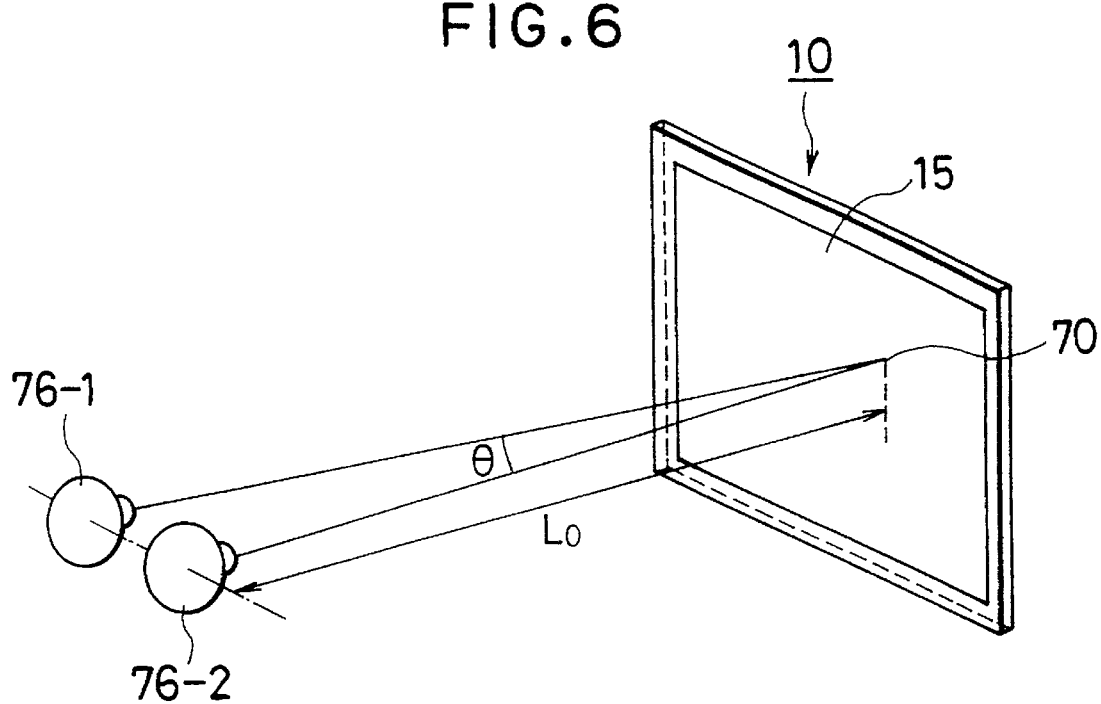
FIG. 6 is an explanatory diagram showing the position of the eyes of the observer for a space light modulating apparatus of the invention to decide a pixel size in FIG. 5.

The reason why the dimensional ratio in the vertical and horizontal directions of each of the liquid crystal cells 16-1 to 16-N provided in FIG. 5 is set to 30:1 or more will now be described. First, a practical size of the display region 15 in the space light modulating apparatus 10 of the invention shown in FIG. 3 will now be examined. FIG. 6 shows a positional relation between the hologram and the observer in the case where a phase distribution of 1-dimensional holograms is formed in the display region 15 of the space light modulating apparatus 10 in the invention and a hologram is reconstructed. A distance $L_0$ when a point 70 in the display region 15 is seen by the left eye 76-1 and right eye 76-2 of the observer is set to $L_0$=250 mm. In this case, a congestion angle θ in the horizontal direction at which a reproduction light from the point 70 in the display region 15 reaches the left and right eyes 76-1 and 76-2 is almost equal to 15°. A phase distribution to perform a diffraction by using the 1-dimensional holograms at the congestion angle θ, namely, a pitch in the horizontal direction of the interference fringes is equal to about 5 μm when it is assumed that a hologram is reconstructed by using the light of a wavelength of 633 nm. Therefore, a pitch interval of the pixels which express the phase distribution of the 1-dimensional holograms in the stripe regions formed in the horizontal direction needs to be a value of 5 μm or less. On the other hand, with respect to the vertical direction, since there is no parallax in case of a 1-dimensional hologram, it is sufficient to set the resolution to a value similar to that of the display of the existing television receiver. For example, it is intended to realize the resolution corresponding to 1125 scan lines in the vertical direction in the high definition television (HDTV) which is at present being put into practical use. In case of observing a hologram at a distance $L_0$=250 mm by setting the number of scan lines in the vertical direction to 1125, the length $L_{10}$ in the vertical direction of the liquid crystal cell in FIG. 5 is equal to 74 μm. Therefore, in the liquid crystal cells 16-1 to 16-N in FIG. 5, the vertical width $L_{10}$=74 μm and the lateral width $L_{20}$=2.5 μm, so that the vertical/horizontal ratio $L_{10}$/$L_{20}$=about 30.

For example, when the resolution in the horizontal direction is raised by using the liquid crystal cells 16-1 to 16-N having the vertical/horizontal ratio of about 30 as a reference, the pitch interval $L_{21}$ becomes further fine and the lateral width $L_{20}$ also decreases, so that the vertical/horizontal ratio is set to 30 or more. When the screen size is further increased while keeping the pitch interval $L_{21}$=5 μm and the lateral width $L_{20}$=2.5 μm, the liquid crystal cells 16-1 to 16-N further become long in the vertical direction and the lateral width $L_{10}$ increases, so that the vertical/lateral ratio is set to 30 or more.

Figure 7:
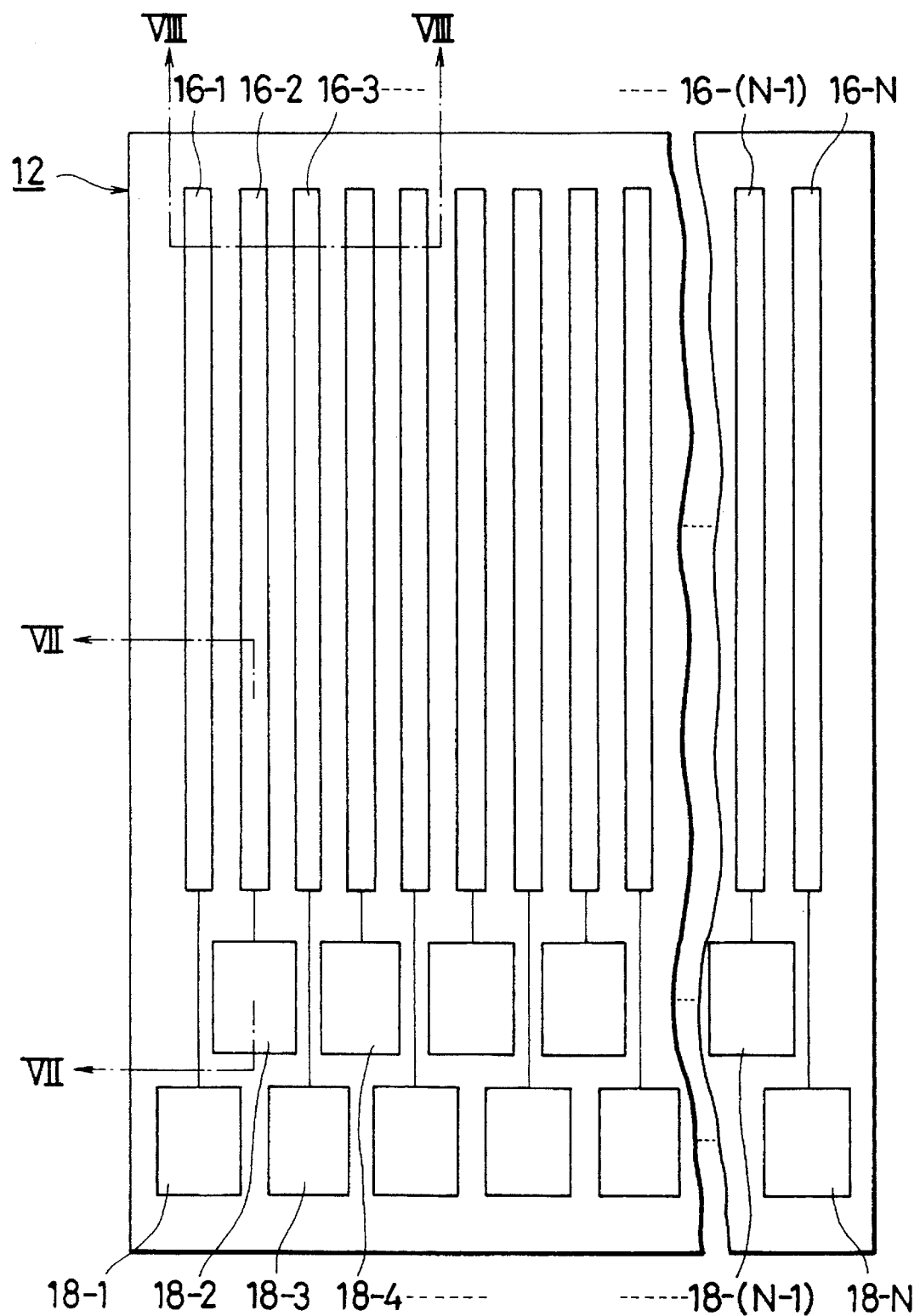
FIG. 7 is an explanatory diagram practically showing a driving section with respect to a liquid crystal segment in FIG. 6.

FIG. 7 shows a practical structure of the driving section 14 shown in FIG. 5. In one liquid crystal segment 12, driving elements 18-1 to 18-N are arranged in a lump at one position on the lower side in correspondence to the (N) liquid crystal cells 16-1 to 16-N arranged in the horizontal direction. For example, thin film field effect transistors are used as driving elements 18-1 to 18-N.

Figure 8:
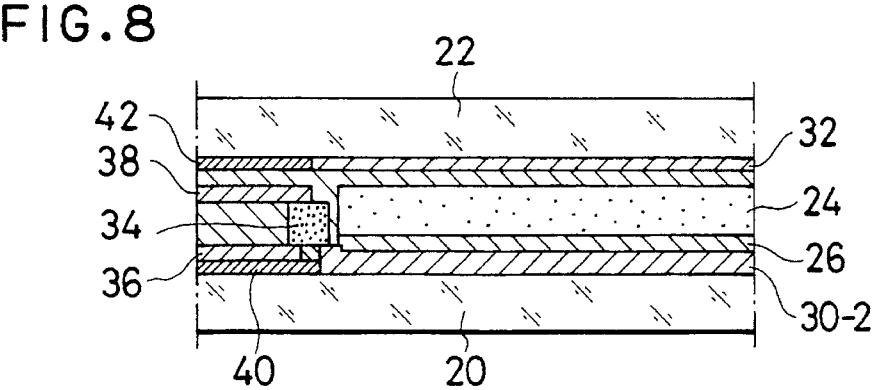
FIG. 8 is a cross sectional view taken along the line VII—VII in FIG. 7.

FIG. 8 shows a cross sectional view taken along the line VII—VII in FIG. 7. The space light modulating apparatus of the invention has glass substrates 20 and 22 on both sides. A transparent electrode 30-2 is formed on the inside of the glass substrate 20. A transparent electrode 32 is also formed on the inside of the glass substrate 22. A liquid crystal 24 is sandwiched between the transparent electrodes 30-2 and 32 through an insulating film 26. The driving element 18 is assembled on the left side of the liquid crystal 24. In the driving element 18, a thin film field effect transistor 34 is built in a portion between light shielding films 40 and 42 through the insulating film 26. A gate electrode 36 is led out to the lower side of the transistor 34. A source electrode 38 is led out from the upper portion of the transistor 34. A drain electrode is directly connected to the transparent electrode 30-2 on the lower side.

Figure 9:
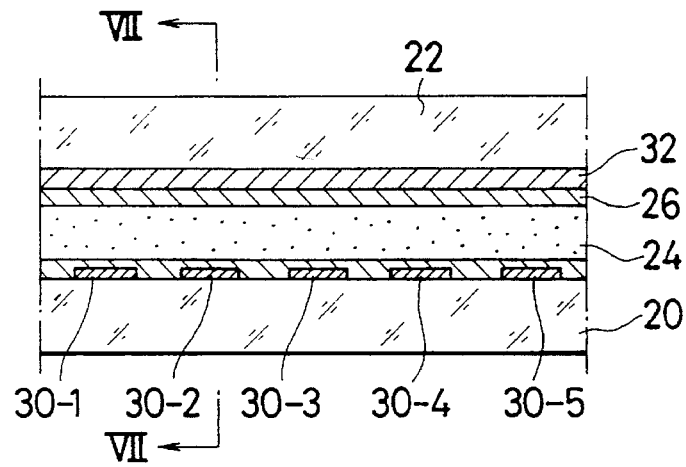
FIG. 9 is a cross sectional view taken along the line VIII—VIII in FIG. 7.

FIG. 9 shows a cross sectional view taken along the line VIII—VIII in FIG. 7 and clarifies a liquid crystal structure to form five liquid crystal cells 16-1 to 16-5. Five transparent electrodes 30-1, 30-2, - - -, 30-5 covered by the insulating film 26 are divisionally formed on the inside of the glass substrate 20 on one side in the direction perpendicular to the surface of the paper of the drawing. The transparent electrodes 30-1 to 30-5 decide a display region of the liquid crystal cells 16-1 to 16-5 whose dimensional ratio in the vertical and horizontal directions shown in FIG. 7 is equal to or larger than 30:1. Namely, the liquid crystal cells 16-1 to 16-N arranged in the stripe regions in the horizontal direction in the space light modulating apparatus 10 of the invention are realized by the shapes of the transparent electrodes 30-1, 30-2, - - -, on one side in the liquid crystal structure shown in FIG. 9. Therefore, a process to set the vertical/horizontal ratio of the liquid crystal cells 16-1 to 16-N in FIG. 7 to 30:1 or more specifically denotes that the vertical/horizontal ratio of the shapes of the transparent electrodes 30-1 to 30-N on one side of the liquid crystal structure in FIG. 9 is set to 30:1 or more. The electrode 32 provided on the upper side of the liquid crystal 24 by being covered by the insulating film 26 is formed by one common electrode with respect to the liquid crystal cells in FIG. 7 arranged in the horizontal direction.

Figure 10:
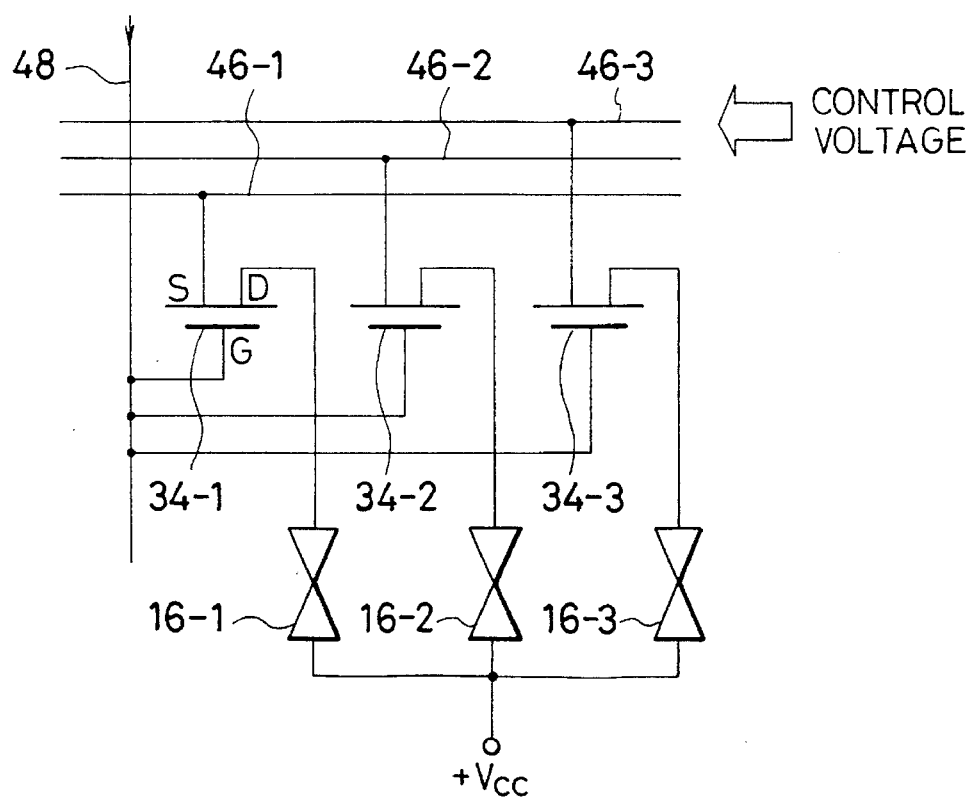
FIG. 10 is a circuit diagram showing a circuit construction of the driving section in FIG. 7.

FIG. 10 shows a circuit construction of the driving section in FIG. 7 and three driving elements are shown as an example. Control lines 46-1, 46-2, and 46-3 and a common scan line 48 are arranged for thin film field effect transistors 34-1, 34-2, and 34-3 in such a direction that they cross perpendicularly each other. The transistor 34-1 will now be described as an example. The control line 46-1 is connected to a source. The scan line 48 is connected to a gate. Further, a drain is directly connected to the liquid crystal cell 16-1. This point also shall apply to the other transistors 34-2 and 34-3. The other electrodes of the liquid crystal cells 16-1 to 16-3 are connected by a common electrode and are pulled up to a power source voltage $+V_{cc}$. To drive the liquid crystal cells 16-1 to 16-3 by the control of the transistor 34-1, a particular control voltage which is necessary to control the refractive index of each of the liquid crystal cells 16-1 to 16-3 is applied to each of the control lines 46-1 to 46-3 and, in this state, an operating voltage is applied to each gate through the scan line 48. Thus, a portion between the source and the drain is made conductive. The driving voltage which is obtained by subtracting the applied voltage to each of the control lines 46-1 to 46-3 from the power source voltage $+V_{cc}$ is applied to each of the liquid crystal cells 16-1 to 16-3, thereby controlling the refractive index according to the applied voltage. When the refractive index of the liquid crystal cell changes, the optical distance of the light which is transmitted changes. As for the refractive index of the liquid crystal cell, it is ideally demanded that the phase of the transmitted light can be arbitrarily expressed by an angle within a range from 0 to $2\pi$. That is, it is demanded to change such a phase within a range of the optical distance corresponding to the wavelength of light. A thickness d of liquid crystal in this case is determined under a condition such that the product $\Delta n \cdot d$ of the thickness d and a maximum refractive index change $\Delta n$ which can be controlled by the applied voltage is equal to a wavelength $\lambda$ of reproduction light.

Such a control of the thin film field effect transistors 34-1 to 34-3 by the scan line 48 and the control lines 46-1 to 46-3 is executed for every liquid crystal segment 12 while setting the (N=256) driving elements 18-1 to 18-N shown in FIG. 7 to one unit. With respect to the whole display region 15 in the space light modulating apparatus 10 in FIG. 3, by driving the liquid crystal segments 12-11 to 12-nm in a lump in parallel, a phase distribution of the 1-dimensional holograms can be produced in each of the stripe regions 60-1 to 60-n in the horizontal direction.

Figure 11:
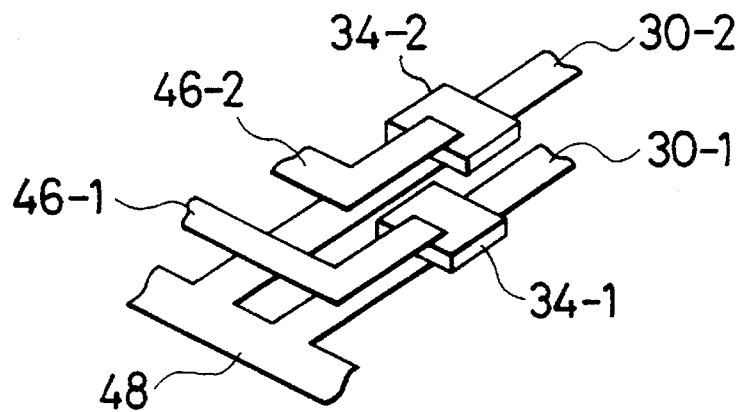
FIG. 11 is an explanatory diagram showing a structure of the driving section in FIG. 7.

FIG. 11 is a diagram showing a structure of two driving elements provided in the driving section in FIG. 7. The scan line 48 is commonly connected to the thin film field effect transistors 34-1 and 34-2. The control lines 46-1 and 46-2 are individually connected. The transparent electrodes 30-1 and 30-2 for every liquid crystal cell shown in FIG. 9 are directly connected.

Figure 12:
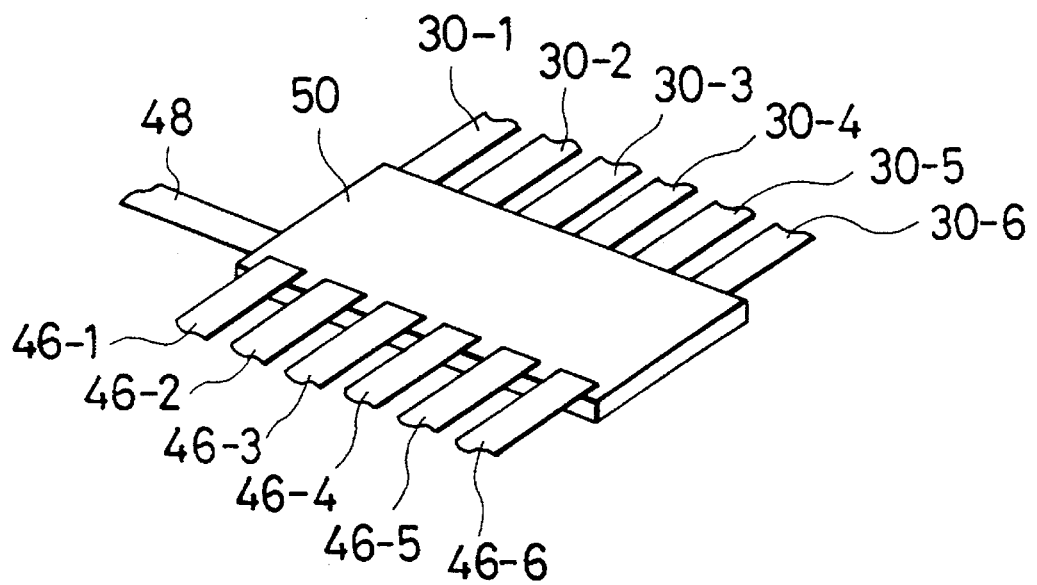
FIG. 12 is an explanatory diagram showing another structure of the driving section in FIG. 7.

FIG. 12 is a diagram showing a state in which six driving elements are used as one unit and are realized as a transistor array 50. The common scan line 48 is connected to six thin film field effect transistors built in the transistor array 50. The control lines 46-1 to 46-6 and the transparent electrodes 30-1 to 30-6 of each liquid crystal cell are individually connected to each thin type transistor. As a transistor array 50, it is also possible to install 256 driving elements 18-1 to 18-N shown in FIG. 7 as a unit.

Figure 13:
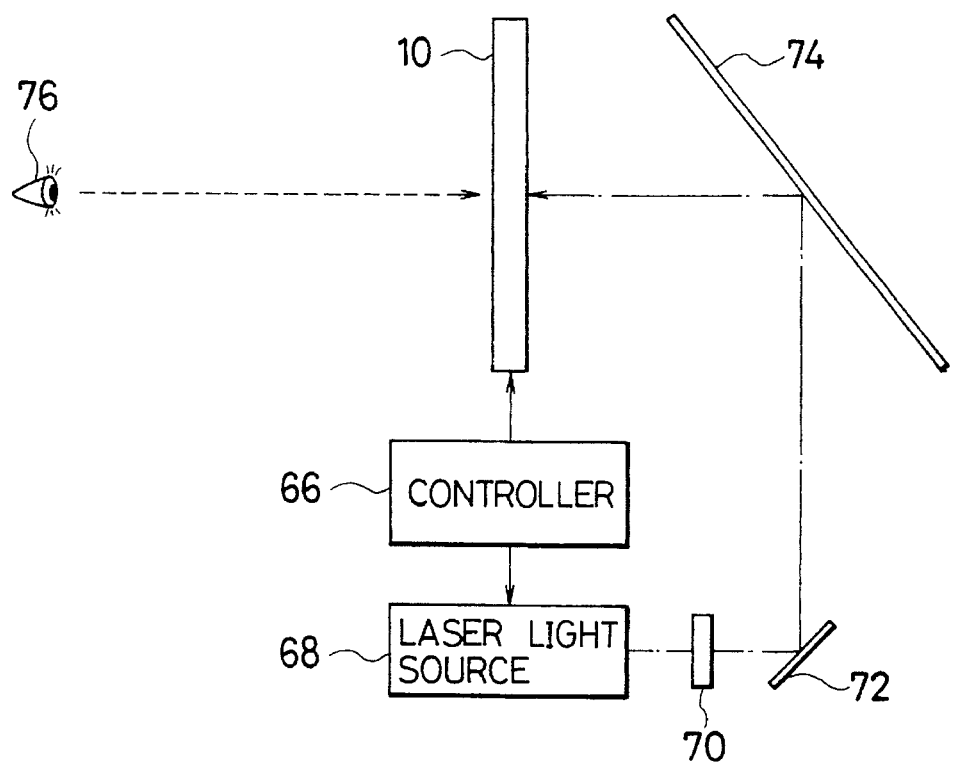
FIG. 13 is an explanatory diagram of a hologram reconstructing apparatus of the transmission type using the space light modulating apparatus of the invention.

FIG. 13 shows a hologram reconstructing apparatus using the space light modulating apparatus of the invention. The writing operation of a phase distribution of 1-dimensional holograms into the stripe region in the horizontal direction of the space light modulating apparatus 10 of the invention is executed by a controller 66. In order to reconstruct a hologram image on the basis of a plurality of phase distributions of the 1-dimensional holograms written in the space light modulating apparatus 10, a laser light source 68, a shutter 70, and mirrors 72 and 74 are provided. As a laser light source 68, for example, a reproduction light (reference light) having a center wavelength of 633 nm is emitted and is reflected by the mirrors 72 and 74 through the shutter 70. After that, the light is irradiated as a transmission light to the space light modulating apparatus. The laser light source 68 has an enlarging optical system. The reproduction light is irradiated to the whole display region of the space light modulating apparatus 10 by the reflecting mirror 74.

Figure 14:
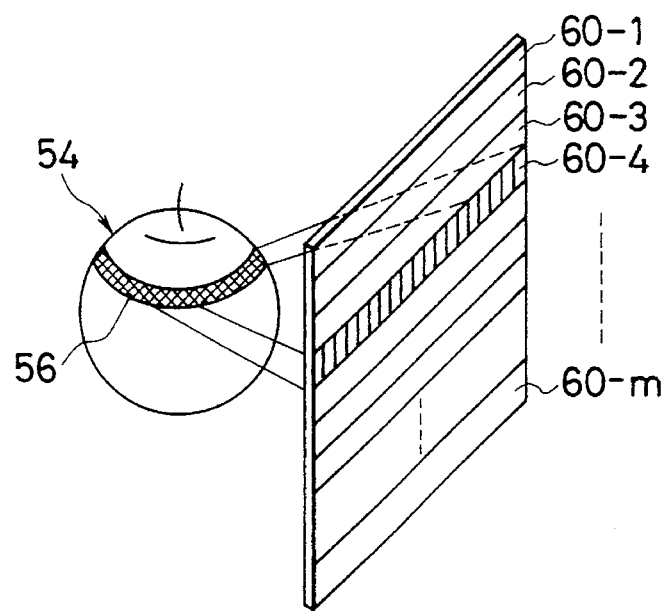
FIG. 14 is an explanatory diagram of the principle of a 1-dimensional hologram which is reconstructed in the invention.

FIG. 14 shows the principle for making the 1-dimensional hologram in the space light modulating apparatus 10 in FIG. 13 and for reconstructing a hologram image. As a phase distribution of the 1-dimensional holograms which are formed in the stripe regions 60-1 to 60-m of the space light modulating apparatus 10, a phase distribution in only the horizontal direction when an object 54 is projected to the display screen and is individually seen for each stripe region 60-1 to 60-m is formed. For example, with respect to the stripe region 60-4, the phase distribution when the object 54 is seen in the horizontal direction in the region 56 is expressed. Specifically speaking, the object 54 is an imaginary object that is specified by 3-dimensional data of a graphic computer or the like. Therefore, a phase distribution (interference fringes) of the 1-dimensional holograms of the stripe regions 60-1 to 60-m can be obtained by calculations from the 3-dimensional data of the imaginary object 54.

Figure 15:
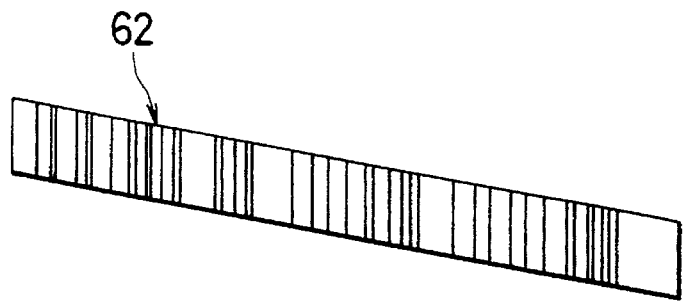
FIG. 15 is an explanatory diagram showing a phase distribution of 1-dimensional holograms which are formed in stripe regions in FIG. 14.

FIG. 15 shows a 1-dimensional phase distribution in one stripe region. That is, a 1-dimensional phase distribution 62 of the stripe region is obtained as computer data. It is sufficient to drive each liquid crystal cell existing at the corresponding position in the X direction in accordance with the computer data obtained.

Figure 16:
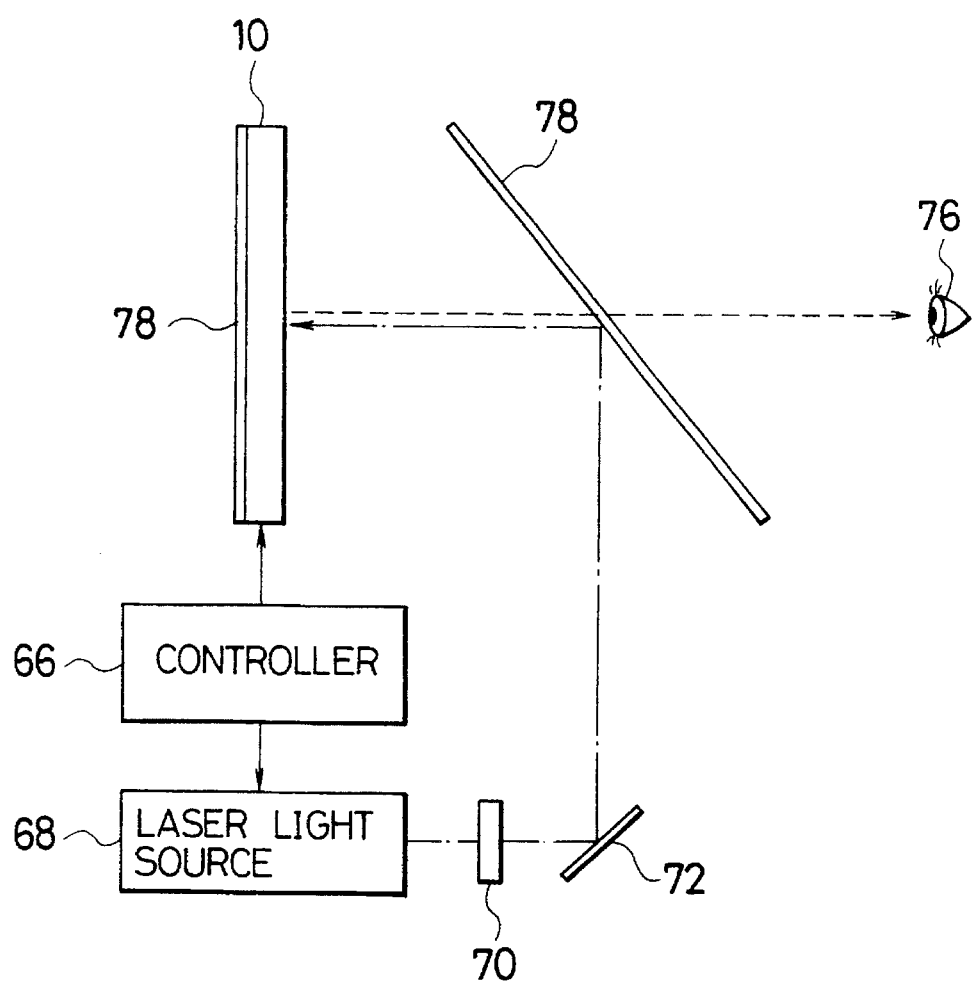
FIG. 16 is an explanatory diagram of a hologram reconstructing apparatus of the reflection type using the space light modulating apparatus of the invention.

FIG. 16 shows the second embodiment of a hologram reconstructing apparatus using the space light modulating apparatus of the invention and is characterized in that the space light modulating apparatus is used as a reflection type. A half mirror 78 is closely arranged on the surface on the left side of the space light modulating apparatus 10. The reproduction light (reference light) from the laser light source 68 is reflected by the half mirror 78 through the shutter 70 and mirror 72 and enters the space light modulating apparatus 10. Further, the light is reflected by the half mirror 78, thereby allowing a hologram image to be seen by the eyes 76 of the observer through the half mirror 78. In the reflection type space light modulating apparatus 10, since the reference light passes twice the liquid crystal portion of the space light modulating apparatus, it is sufficient to write the phase distribution of the 1-dimensional holograms by the controller 66 so as to obtain a control amount which is half of the control amount of the liquid crystal cell in the embodiment of FIG. 13. However, a liquid crystal of homogeneous orientation in which polarization is preserved is used. As a hologram reconstructing apparatus using the space light modulating apparatus 10 of the invention, a construction of a proper reconstructing apparatus can be used without limiting to the embodiments of FIGS. 13 and 16.

Figure 17:
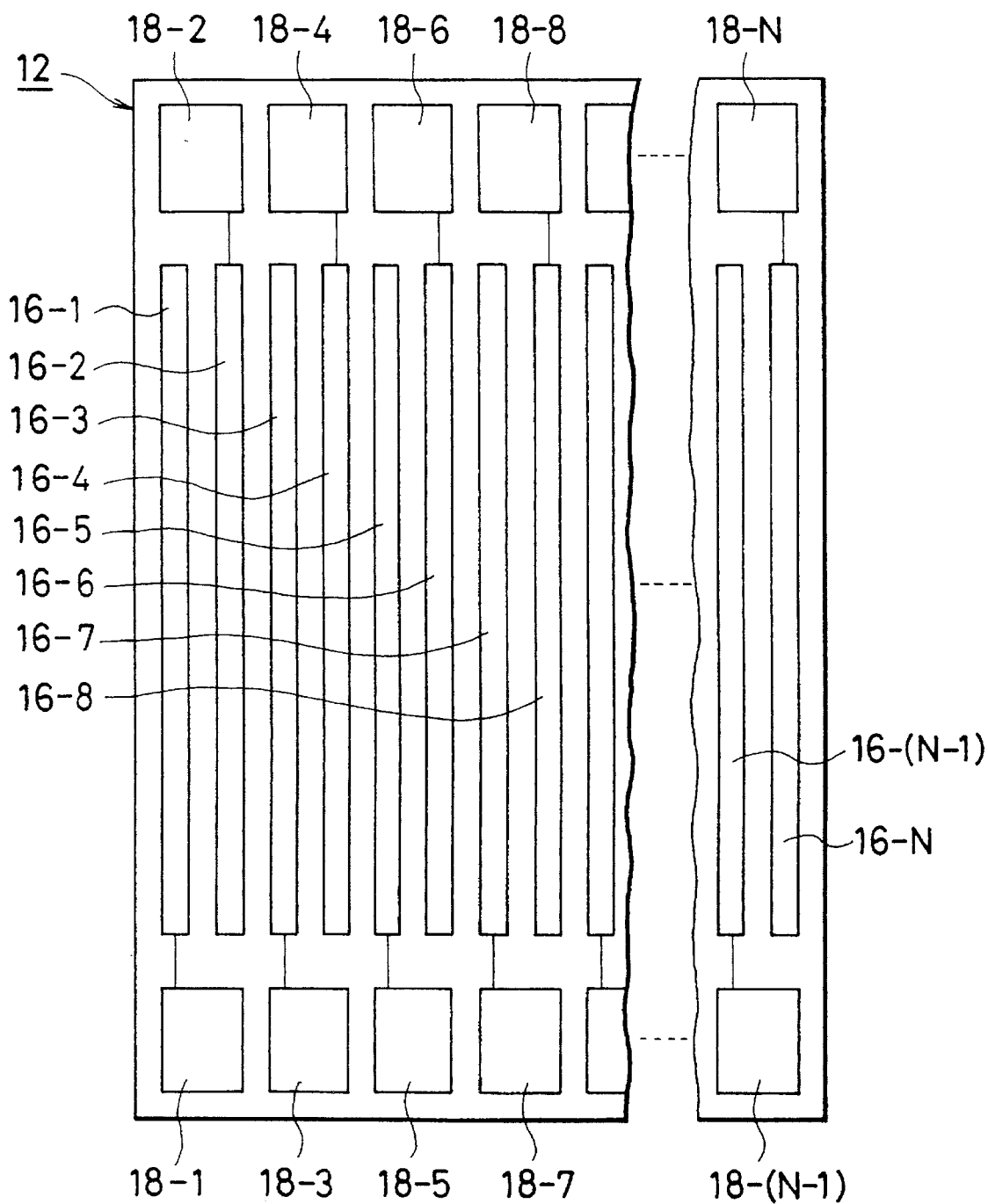
FIG. 17 is an explanatory diagram of liquid crystal segments in the invention in which driving elements of the driving section are vertically provided.

FIG. 17 shows another embodiment of driving elements each of which is provided for the liquid crystal segment 12 of the space light modulating apparatus of the invention. In the embodiment, for the liquid crystal cells 16-1 to 16-N, the driving elements 18-1, 18-3, - - - , 18-(N-l) on the lower side and the driving elements 18-2, 18-4, - - - , 18-N on the upper side are separately arranged at two locations.

Figure 18:
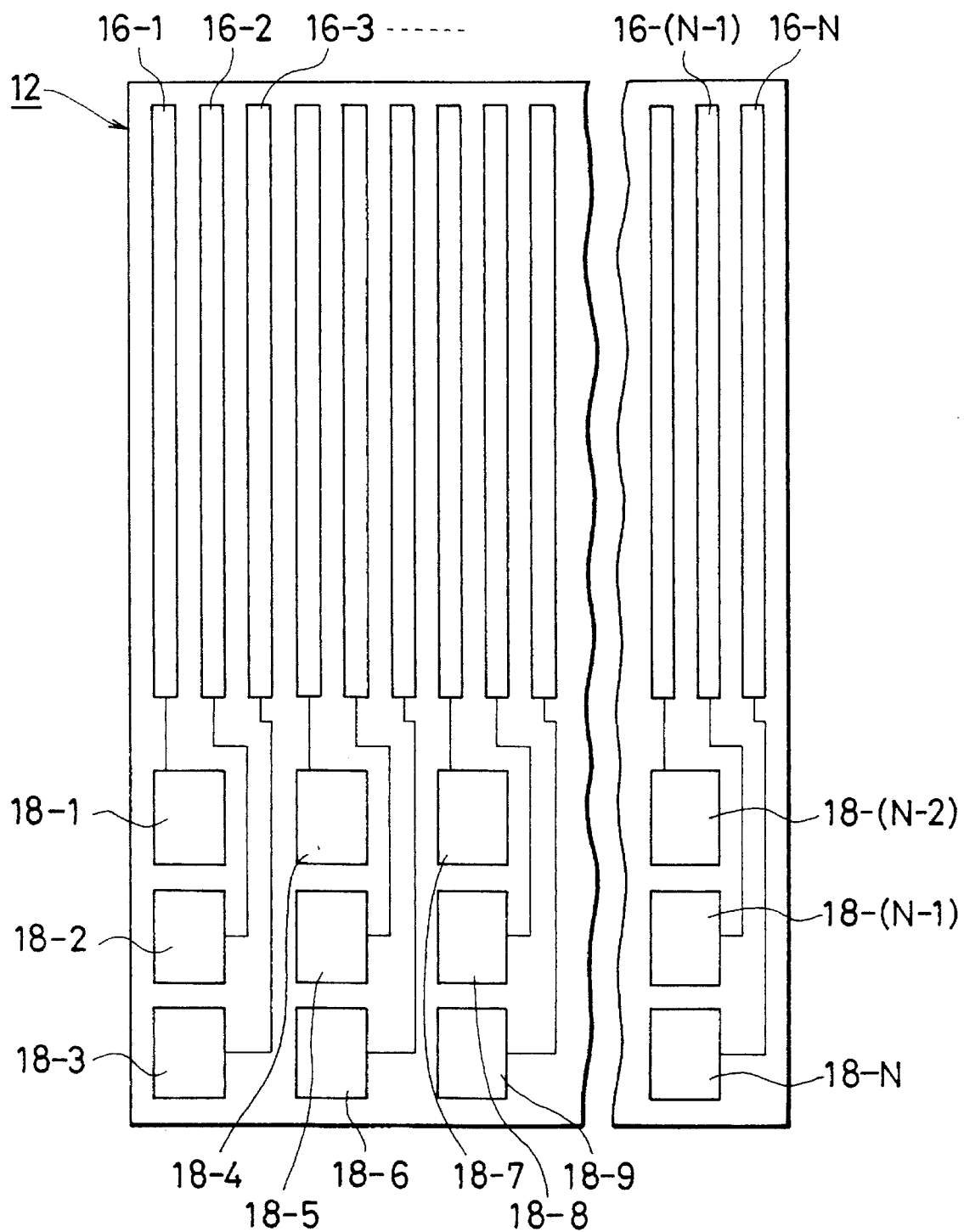
FIG. 18 is an explanatory diagram of liquid crystal segments in the invention in which the driving elements of the driving section are arranged by three stages on the lower side.

FIG. 18 shows another arrangement of the driving elements each of which is provided for each liquid crystal segment 12 of the space light modulating apparatus of the invention. In the embodiment, the driving elements 18-1 to 18-N are separately arranged in three stages on the lower side of the liquid crystal cells 16-1 to 16-N.

Figure 19:
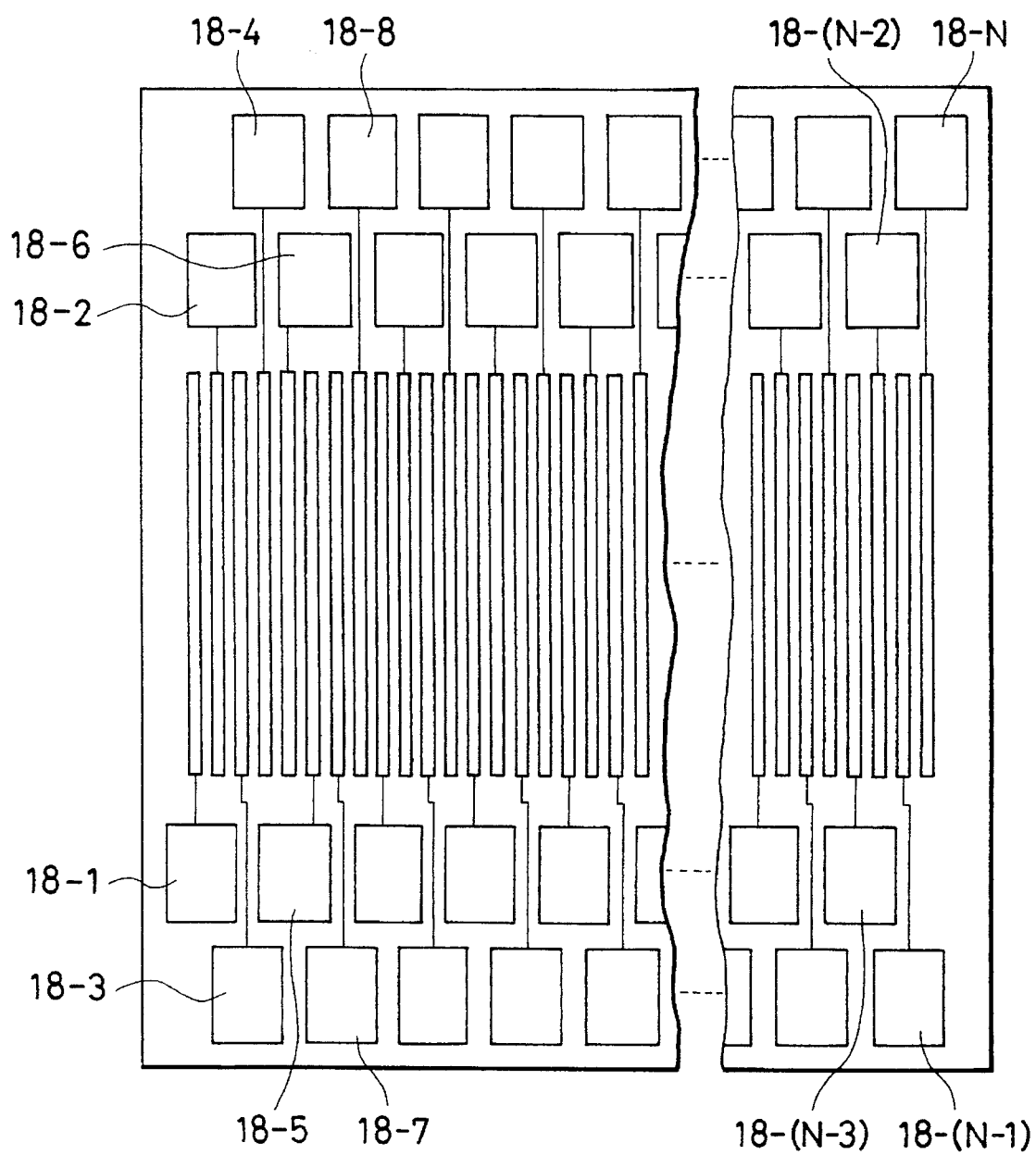
FIG. 19 is an explanatory diagram of liquid crystal segments in the invention in which a pixel density in the horizontal direction is raised and the driving elements in the driving section are vertically provided by every two stages.

FIG. 19 shows another arrangement structure of the driving elements which are provided for the liquid crystal segments 12 of the space light modulating apparatus of the invention. Another embodiment is characterized in that the number of liquid crystal cells 16-1 to 16-N is set to (N=512) which is twice as large as that in the embodiment of FIG. 7 and that in association with the realization of a high density of the liquid crystal cells, the driving elements 18-1 to 18-N are separately arranged by two rows on the upper side and two rows on the lower side.

With respect to the arrangements of the driving elements in the embodiments of FIGS. 7, 17, 18, and 19 described above, as partially shown in FIG. 4, even when the driving sections 14-11, 14-12, - - - don't exist in the horizontal direction of the liquid crystal segments 12-11, - - - 12-12, in which a number of liquid crystal cells are arranged and the driving sections 14-11, 14-12, correspond to the non-transmitting regions, the formation of the phase distribution as a 1-dimensional hologram in the horizontal direction is not obstructed.

Figure 20:
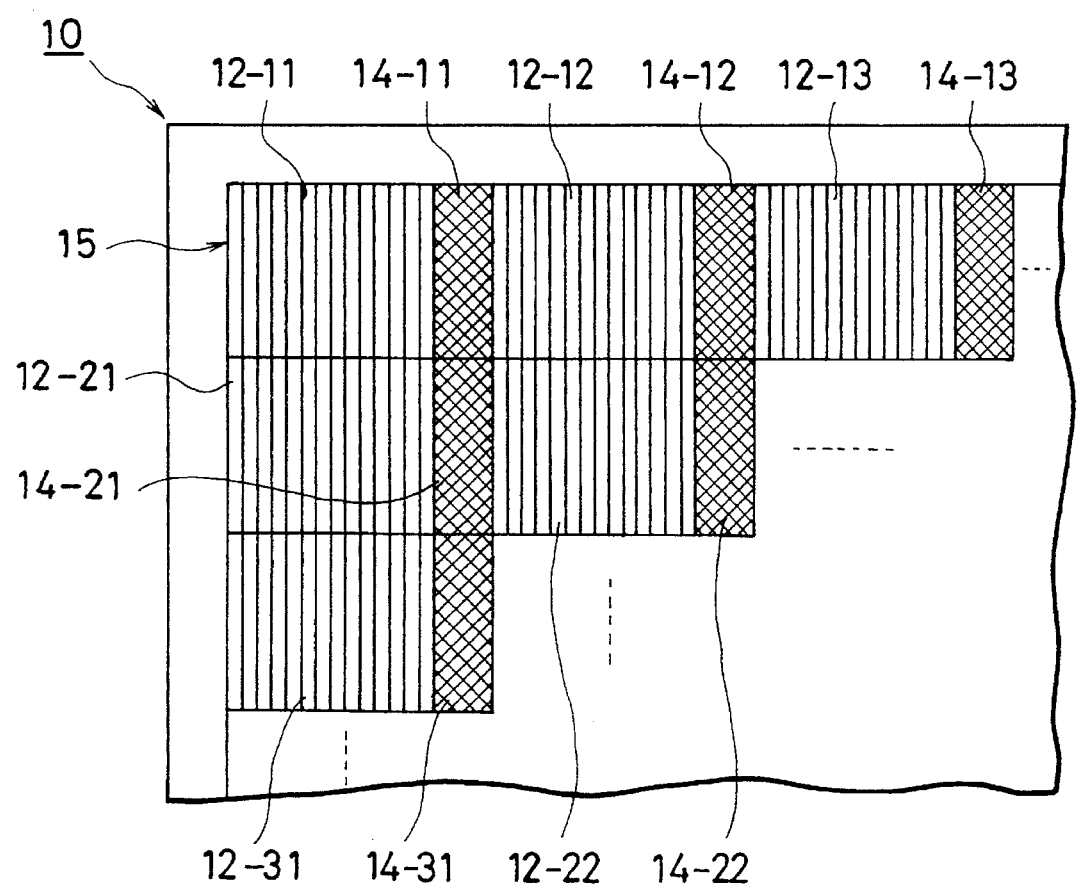
FIG. 20 is an explanatory diagram showing another embodiment in which the driving sections of the liquid crystal segments in the invention are located and arranged in the horizontal direction.

FIG. 20 shows another arrangement of liquid crystal segments in the space light modulating apparatus of the invention. This embodiment is characterized in that the driving sections 14-11, 14-12, - - - of the liquid crystal segments 12-11, 12—12, - - - are arranged between the adjacent liquid crystal segments in the horizontal direction. As mentioned above, even when the driving sections 14 -11, 14-12, - - - exist in the horizontal direction, the driving sections 14-11, 14-12, - - - are regarded as fixed phase distribution portions in which the light intensity is equal to zero in any of the transmission type and the reflection type. Although a resolution is slightly low, an influence is hardly exerted on the reproduction of the image by the 1-dimensional hologram and such a construction can be sufficiently put into practical use.

According to the invention as mentioned above, a phase distribution of the 1-dimensional hologram can be produced at a high precision by the 1-dimensional array of the pixels having a high resolution in the stripe-like display regions in the horizontal direction. A hologram image of a resolution similar to that of the high definition television can be electronically reconstructed. Since pixels can be arranged so that the driving section as a non-display region doesn't exist in the horizontal direction, the non-display region by the driving section doesn't exist in the horizontal direction, a phase distribution in the horizontal direction of the 1-dimensional hologram is accurately formed, and a hologram solid image having a high resolution can be obtained.

Although the above embodiment has been described with respect to an example of the reconstruction of the 1-dimensional hologram image, the space light modulating apparatus of the invention can be freely used as another display apparatus. The invention is not limited by the numerical values shown in the embodiments.

What is claimed is:

1. A space light modulating apparatus, comprising:
   a plurality of pixels arranged in a horizontal direction, each of said plurality of pixels having a dimensional ratio of a vertical width in the vertical direction to a lateral width in the horizontal direction which is at least 30:1; and
   a plurality of drivers for individually controlling optical characteristics of said plurality of pixels, respective ones of said plurality of drivers being connected to respective pixels and arranged in a staggered formation on One side of said plurality of pixels.

2. An apparatus according to claim 1, wherein the plurality of drivers are arranged in a staggered formation on one of a lower side and an upper side of the arrangement of said plurality of pixels.

3. An apparatus according to claim 1, wherein the plurality of drivers are arranged in a staggered formation in at least two rows on a lower side of the arrangement of said plurality of pixels and in a staggered formation in at least two rows on an upper side of the arrangement of said plurality of pixels.

4. An apparatus according to claim 1, wherein said plurality of drivers are arranged alternately on either side of the arrangement of said plurality of pixels in a staggered formation in at least two rows.

5. An apparatus according to claim 1, wherein each of said plurality of pixels has a structure to control a phase of a passing light.

6. An apparatus according to claim 1, wherein each of said plurality of pixels has a structure to control an amplitude of a passing light.

7. An apparatus according to claim 1, wherein each of said plurality of pixels has a liquid crystal structure whose refractive index changes in accordance with an applied voltage.

8. An apparatus according to claim 1, wherein said plurality of pixels form a plurality of stripe regions in the horizontal direction and have a liquid crystal structure whose transmission factor changes in accordance with a voltage that is applied to said liquid crystal structure, said apparatus further comprising a pair of electrodes across which said voltage is applied, said pair of electrodes comprising a first electrode formed by an electrode plate arranged in each of said plurality of stripe regions, and a second electrode formed by arranging in the horizontal direction a plurality of microelectrodes each having a dimensional ratio such that a lateral width in the horizontal direction is smaller than a vertical width in the vertical direction.

9. An apparatus according to claim 8, wherein a dimensional ratio of the vertical to the horizontal directions of each of said plurality of microelectrodes arranged in the horizontal direction is at least 30:1.

10. An apparatus according to claim 8, further comprising hologram forming means for expressing a phase distribution of a 1-dimensional holographic interference pattern in each of said plurality of stripe regions by controlling said plurality of drivers.

11. An apparatus according to claim 8, further comprising:
   hologram forming means for expressing a phase distribution of a 1-dimensional holographic interference pattern in each of said plurality of stripe regions by the control of the plurality of drivers; and
   hologram display means for irradiating a reproduction light to a phase distribution of a plurality of 1-dimensional holographic interference patterns expressed by said hologram forming means and for optically converting a wave front of said reproduction light, thereby displaying a hologram image.

12. A space light modulating apparatus, comprising:
   a predetermined display region divided into a plurality of stripe-like regions each having a screen width ($L_x$) in a horizontal direction and a microwidth ($\Delta L_y$) in a vertical direction;
   a plurality of pixels arranged in the horizontal direction in each of said plurality of strip-like regions, each of said plurality of pixels having a dimensional ratio such that a vertical width in the vertical direction and a lateral width in the horizontal direction is at least 30:1; and a plurality of drivers for individually controlling optical characteristics of each of said plurality of pixels, respective ones of said plurality of drivers being connected to respective pixels and arranged on a first and a second side of said plurality of pixels.

13. An apparatus according to claim 12, wherein the plurality of drivers are arranged on a lower side and an upper side of the arrangement of said plurality of pixels.

14. An apparatus according to claim 12, wherein the plurality of drivers are arranged in a first row on a lower side of the arrangement of said plurality of pixels and in a second row on an upper side of the arrangement of said plurality of pixels.

15. An apparatus according to claim 12, wherein the plurality of drivers are arranged in two rows on a lower side of the arrangement of said plurality of pixels and in two rows on an upper side of the arrangement of said plurality of pixels.

16. An apparatus according to claim 12, wherein each of said plurality of pixels has a structure to control a phase of a passing light.

17. An apparatus according to claim 12, wherein each of said plurality of pixels has a structure to control an amplitude of a passing light.

18. An apparatus according to claim 12, wherein each of said plurality of pixels has a liquid crystal structure whose refractive index changes in accordance with an applied voltage.

19. An apparatus according to claim 12, wherein said plurality of pixels have a liquid crystal structure whose transmission factor changes in accordance with a voltage which is applied to said liquid crystal structure, said apparatus further comprising a pair of electrodes across which said voltage is applied, said pair of electrodes comprising, a first electrode formed by an electrode plate arranged in each of said plurality of stripe-like regions, and a second electrode formed by arranging in the horizontal direction a plurality of microelectrodes each having a dimensional ratio such that a lateral width in the horizontal direction is smaller than a vertical width in the vertical direction.

20. An apparatus according to claim 19, wherein the dimensional ratio in the vertical and horizontal directions of each of said plurality of microelectrodes arranged in the horizontal direction is at least 30:1.

21. An apparatus according to claim 12, further comprising hologram forming means for expressing a 1-dimensional holographic interference pattern in each of said plurality of stripe-like regions by controlling said plurality of drivers.

22. An apparatus according to claim 12, further comprising:

hologram forming means for expressing a phase distribution of a 1-dimensional holographic interference pattern in each of said plurality of stripe-like regions by the control of the plurality of drivers; and hologram display means for irradiating a reproduction light to a plurality of 1-dimensional hologram interference pattern phase distributions expressed by said hologram forming means and for optically converting a wave front of said reproduction light, thereby displaying a hologram image.

23. A space light modulating apparatus, comprising:

a plurality of pixels arranged in a horizontal direction, each of said plurality of pixels having a dimensional ratio of a vertical width in the vertical direction to a lateral width in the horizontal direction which is at least 30:1; and a plurality of drivers for individually controlling optical characteristics of said plurality of pixels, respective ones of said plurality of drivers being connected to respective pixels and arranged on a first side and a second side of said arrangement of said plurality of pixels.

24. An apparatus according to claim 23, wherein the plurality of drivers are arranged in at least one row on a lower side of the arrangement of said plurality of pixels and in at least one row on an upper side of the arrangement of said plurality of pixels.

* * * * *

UNITED STATES PATENT AND TRADEMARK OFFICE
CERTIFICATE OF CORRECTION

PATENT NO. : 5,594,564
DATED : January 14, 1997
INVENTOR(S) : Manabu ISHIMOTO, et al.

It is certified that error appears in the above-indentified patent and that said Letters Patent is hereby corrected as shown below:

Cover Page, Item [56], please change U.S. Patent "5,237,443" to --5,234,433--.

Col. 5, line 2, after "enlarged" insert --view of--.

Col. 7, line 26, change "An" to --Δn--.

Col. 9, line 15, delete "---". and insert-- --- -- after "12-12".
line 17, after "14-12," insert -- --- --.
line 67, change "One" to --one--.

Signed and Sealed this

Twenty-seventh Day of May, 1997

Attest:

BRUCE LEHMAN

*Attesting Officer*   *Commissioner of Patents and Trademarks*